(12) United States Patent
Wang

(10) Patent No.: US 11,584,275 B2
(45) Date of Patent: Feb. 21, 2023

(54) HEADREST ASSEMBLY CONFIGURED TO RESIST VIBRATION

(71) Applicant: Daimay North America Automotive, Inc., Redford, MI (US)

(72) Inventor: Jianhua Wang, Novi, MI (US)

(73) Assignee: Daimay North America Automotive, Inc., Redford, MI (US)

(*) Notice: Subject to any disclaimer, the term of this patent is extended or adjusted under 35 U.S.C. 154(b) by 372 days.

(21) Appl. No.: 16/902,605

(22) Filed: Jun. 16, 2020

(65) Prior Publication Data

US 2021/0387554 A1 Dec. 16, 2021

(51) Int. Cl.
| | | |
|---|---|---|
| *B60N 2/844* | (2018.01) | |
| *F16C 1/10* | (2006.01) | |
| *B60N 2/841* | (2018.01) | |
| *B60N 2/856* | (2018.01) | |

(52) U.S. Cl.
CPC ............ *B60N 2/841* (2018.02); *B60N 2/856* (2018.02); *F16C 1/10* (2013.01); *F16C 2326/08* (2013.01)

(58) Field of Classification Search
CPC ........ B60N 2/838; B60N 2/841; B60N 2/844; B60N 2/847; B60N 2/856; B60N 2/875; B60N 2/85; B60N 2002/952; B60N 2002/957; B60N 2002/971
USPC .......................................................... 297/408
See application file for complete search history.

(56) References Cited

U.S. PATENT DOCUMENTS

| | | | |
|---|---|---|---|
| 4,511,180 A * | 4/1985 | Klaus ..................... | B60N 2/874 297/391 |
| 7,113,171 B2 | 10/2006 | Fowler et al. | |
| 8,157,320 B2 | 4/2012 | Sayama | |
| 8,246,116 B1 * | 8/2012 | Sutter, Jr. ............... | B60N 2/844 297/408 |
| 8,292,363 B2 * | 10/2012 | Yamaguchi ............ | B60N 2/888 297/216.12 |
| 8,979,203 B1 * | 3/2015 | Sutter, Jr. ............... | B60N 2/844 297/408 |
| 10,166,899 B1 * | 1/2019 | Jiang ..................... | B60N 2/856 |

(Continued)

FOREIGN PATENT DOCUMENTS

| | | |
|---|---|---|
| CN | 101254760 A | 9/2008 |
| CN | 101641237 A | 2/2010 |

(Continued)

OTHER PUBLICATIONS

International Search Report and Written Opinion for International Application No. PCT/CN2016/103497 dated Jul. 21, 2017.

(Continued)

*Primary Examiner* — Robert Canfield
(74) *Attorney, Agent, or Firm* — Carlson, Gaskey & Olds, P.C.

(57) ABSTRACT

This disclosure generally relates to a headrest assembly, seat, and a method of use. In the disclosure, a head restraint is moveable from an upright position to a folded position by movement of either the push-button or a lever. The disclosed arrangement provides two ways to fold a head restraint, and can further be integrated with another assembly, such as a seat back folding assembly. The disclosed arrangement is further configured to resist vibration, leading to a tighter, more stable design, which provides increased customer satisfaction.

15 Claims, 5 Drawing Sheets

(56) References Cited

U.S. PATENT DOCUMENTS

| | | | | |
|---|---|---|---|---|
| 10,427,572 B2* | 10/2019 | Jeong | ............ | B60N 2/844 |
| 11,148,569 B2* | 10/2021 | Xu | ............ | B60N 2/856 |
| 2005/0067874 A1 | 3/2005 | Kamrath et al. | | |
| 2005/0156456 A1 | 7/2005 | Robinson et al. | | |
| 2008/0036263 A1* | 2/2008 | Little | ............ | B60N 2/856 |
| | | | | 297/409 |
| 2008/0203801 A1* | 8/2008 | Jammalamadaka | ... | B60N 2/856 |
| | | | | 297/408 |
| 2010/0078972 A1 | 4/2010 | Sayama | | |
| 2010/0133889 A1* | 6/2010 | Lutzka | ............ | B60N 2/859 |
| | | | | 297/408 |
| 2010/0283305 A1* | 11/2010 | Yetukuri | ............ | B60N 2/844 |
| | | | | 297/408 |
| 2011/0095592 A1* | 4/2011 | Willard | ............ | B60N 2/859 |
| | | | | 297/408 |
| 2013/0140866 A1* | 6/2013 | Yetukuri | ............ | B60N 2/844 |
| | | | | 297/408 |
| 2013/0193736 A1* | 8/2013 | Shimizu | ............ | B60N 2/865 |
| | | | | 297/391 |
| 2014/0028071 A1* | 1/2014 | Gunther | ............ | B60N 2/847 |
| | | | | 297/391 |
| 2015/0232002 A1* | 8/2015 | Little | ............ | B60N 2/844 |
| | | | | 297/408 |
| 2015/0266401 A1* | 9/2015 | Grable | ............ | B60N 2/844 |
| | | | | 297/408 |
| 2015/0375650 A1* | 12/2015 | Talamonti | ............ | B60N 2/2222 |
| | | | | 297/391 |
| 2017/0028884 A1* | 2/2017 | Kapusky | ............ | B60N 2/856 |
| 2020/0031264 A1* | 1/2020 | Jiang | ............ | F16C 1/18 |
| 2022/0153176 A1* | 5/2022 | Angelo | ............ | B60N 2/818 |

FOREIGN PATENT DOCUMENTS

| | | | | | |
|---|---|---|---|---|---|
| CN | 101932474 A | | 12/2010 | | |
| CN | 102555864 A | | 7/2012 | | |
| CN | 102627082 A | | 8/2012 | | |
| CN | 202623994 U | | 12/2012 | | |
| CN | 204340778 U | | 5/2015 | | |
| JP | 2006014950 A | * | 1/2006 | ............ | B60N 2/841 |
| JP | 2008253330 A | * | 10/2008 | ............ | B60N 2/844 |
| WO | WO-2015158666 A1 | * | 10/2015 | ............ | B60N 2/841 |
| WO | WO-2018076223 A1 | * | 5/2018 | ............ | B60N 2/844 |

OTHER PUBLICATIONS

International Application No. PCT//CN2016/103497 Filed on Oct. 27, 2016.

* cited by examiner

HEADREST ASSEMBLY CONFIGURED TO RESIST VIBRATION

TECHNICAL FIELD

This disclosure relates to a headrest assembly for a seat in a vehicle. This disclosure also relates to a seat and a method of use. The headrest assembly is configured to resist vibration.

BACKGROUND

Headrests are configured to be positioned relative to the rear of an occupant's head and/or neck. Many vehicles include foldable seat backs in order to provide additional room in the vehicle for storage and transport of goods. Before folding a vehicle seat back, headrests are sometimes also folded to prevent interference between the headrest and another vehicle seat, for example.

SUMMARY

A headrest assembly according to an exemplary aspect of the present disclosure includes, among other things, a head restraint including a push-button and a lever rotatable by a pull cable. The head restraint is moveable from an upright position to a folded position by movement of the push-button or the lever. Further, the head restraint includes a pawl configured to resist vibrations of the head restraint.

In a further embodiment, the push-button is configured to move in a linear direction along a first axis, and wherein the lever is configured to rotate about a second axis perpendicular to the first axis.

In a further embodiment, the head restraint includes a locking plate and a locking trigger engaged with the locking plate when the head restraint is in the upright position, and the locking trigger is configured to disengage the locking plate in response to movement of the push-button or the lever.

In a further embodiment, the pawl includes a first arm having a free end configured to directly contact a projection of the locking plate when the head restraint is in the upright position.

In a further embodiment, the pawl includes a second arm projecting from the first arm and configured to directly contact the locking trigger.

In a further embodiment, the second arm includes a first section projecting normally from the first arm and a second section projecting normally from the first section, and the second section directly contacts the locking trigger.

In a further embodiment, the push-button is directly coupled to a push-pin, the push-pin is directly coupled to a push-lever, and the push-lever is coupled to the locking trigger via a linkage.

In a further embodiment, the push-lever is configured to translate linear movement of the push-pin into rotational movement of the locking trigger, the push-lever is pivotable about an axis perpendicular to an axis of rotation of the locking trigger, the lever is rotatably moveable in response to movement of the pull-cable, the lever is directly coupled to the push-lever, and rotational movement of the lever causes rotational movement of the locking trigger.

A seat for a motor vehicle according to an exemplary aspect of the present disclosure includes, among other things, a seat back, a pull-cable, and a headrest assembly. The headrest assembly includes a head restraint including a push-button and a lever rotatable by a pull cable. The head restraint is moveable from an upright position to a folded position by movement of the push-button or the lever. Further, the head restraint includes a pawl configured to resist vibrations of the head restraint. The seat also includes an actuator configured to pull the pull-cable to move the head restraint to a folded position and to fold the seat back.

In a further embodiment, the push-button is configured to move in a linear direction along a first axis, and wherein the lever is configured to rotate about a second axis perpendicular to the first axis.

In a further embodiment, the head restraint includes a locking plate and a locking trigger engaged with the locking plate when the head restraint is in the upright position, and the locking trigger is configured to disengage the locking plate in response to movement of the push-button or the lever.

In a further embodiment, the pawl includes a first arm having a free end configured to directly contact a projection of the locking plate when the head restraint is in the upright position.

In a further embodiment, the pawl includes a second arm projecting from the first arm and configured to directly contact the locking trigger.

In a further embodiment, the second arm includes a first section projecting normally from the first arm and a second section projecting normally from the first section, and the second section directly contacts the locking trigger.

In a further embodiment, the push-button is directly coupled to a push-pin, the push-pin is directly coupled to a push-lever, the push-lever is coupled to the locking trigger via a linkage, the push-lever is configured to translate linear movement of the push-pin into rotational movement of the locking trigger, the push-lever is pivotable about an axis perpendicular to an axis of rotation of the locking trigger, the lever is rotatably moveable in response to movement of the pull-cable, the lever is directly coupled to the push-lever, and rotational movement of the lever causes rotational movement of the locking trigger.

In a further embodiment, the seat includes a rod. The head restraint is coupled to the seat by way of the rod. Further, the rod is hollow and the pull-cable is routed through the rod between the actuator and the lever. The head restraint includes a pulley configured to guide the pull-cable between the rod and the lever.

A method according to an exemplary aspect of the present disclosure includes, among other things, folding a head restraint from an upright position to a folded position by movement of a push-button or a lever connected to a pull-cable, and resisting vibration of the head restraint using a pawl.

In a further embodiment, the pawl includes a first arm having a free end configured to directly contact a projection of a locking plate when the head restraint is in the upright position.

In a further embodiment, the pawl includes a second arm projecting from the first arm and configured to directly contact a locking trigger.

In a further embodiment, the second arm includes a first section projecting normally from the first arm and a second section projecting normally from the first section, and the second section directly contacts the locking trigger.

DETAILED DESCRIPTION

This disclosure generally relates to a headrest assembly, seat, and a method of use. In the disclosure, a head restraint is moveable from an upright position to a folded position by movement of either the push-button or a lever. The disclosed arrangement provides two ways to fold a head restraint, and can further be integrated with another assembly, such as a seat back folding assembly. The disclosed arrangement is further configured to resist vibration, leading to a tighter, more stable design, which provides increased customer satisfaction.

Figure 1:
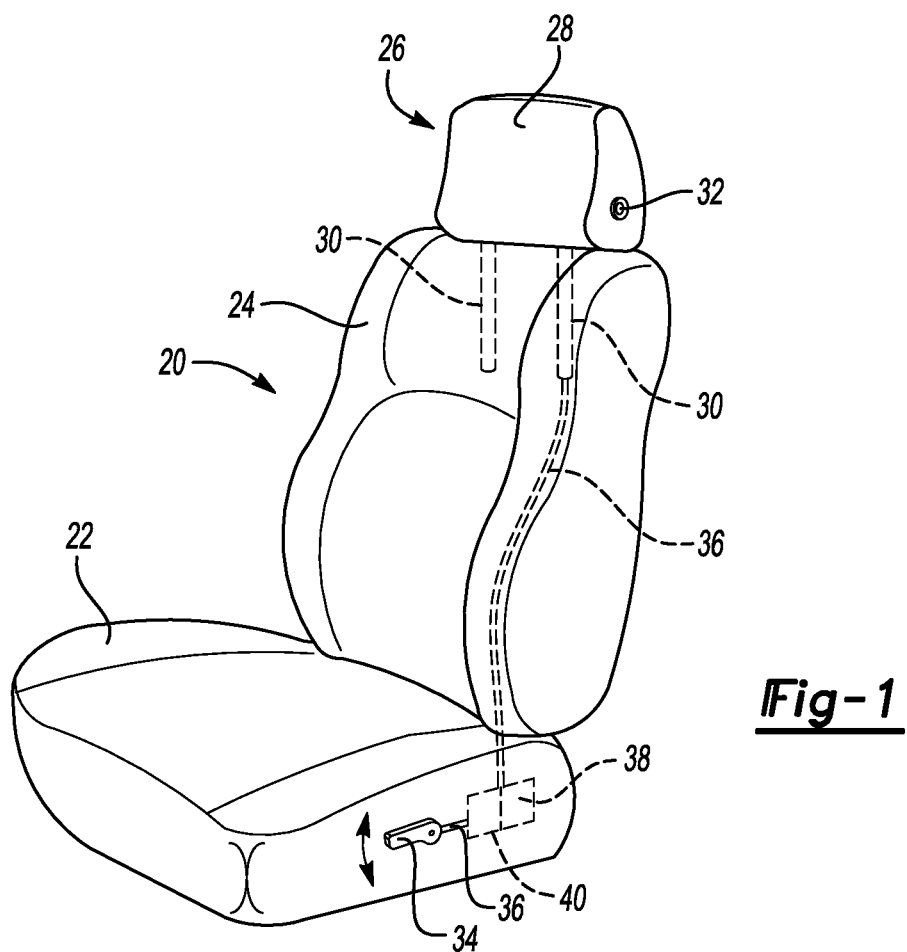
FIG. 1 is a perspective view of a seat including a headrest assembly.

FIG. 1 illustrates an example seat 20 for a motor vehicle. The seat 20 in this example includes a base 22, a seat back 24, and a headrest assembly 26. The headrest assembly 26 includes a head restraint 28 and at least one rod 30. In this example, the head restraint 28 is moveable between an upright position (e.g., FIGS. 1 and 2) and a folded position (FIG. 3). In this example, the head restraint 28 includes a push-button 32 which, when pressed, allows movement of the head restraint 28 between the upright and folded positions.

The seat 20 also includes an actuator 34, which in this case is a lever, coupled to a pull-cable 36. The pull-cable 36 may be routed within one of the rods 30, which may be substantially hollow, between the actuator 34 and the head restraint 28. The actuator 34 is rotatable by an occupant (e.g., user) of the seat 20 or another user. When rotated, the actuator 34 allows movement of the head restraint 28 between the upright and folded positions. Thus, a user has the option of adjusting a position of the head restraint 28 using either the push-button 32 or the actuator 34. In this example, the actuator 34 is connected to the base 22, but it should be understood that the actuator 34 could be provided at other locations on the seat 20, or could be provided at a location spaced-apart from the seat 20.

The pull-cable 36 in this example includes one or more pull-cables. Example pull-cables include Bowden cables (sometimes called push/pull cables). The pull-cable 36 may be connected to a compensator assembly 38 in one example to allow interaction between the pull-cable 36 and other actuation systems associated with the seat 20. The seat 20 may include a seat folding assembly 40 configured to fold the seat back 24 relative to the base 22. The seat folding assembly 40 may be activated by rotation of the actuator 34 in some examples. In one example of this disclosure, rotation of the actuator 34 provides for movement of the head restraint 28 from an upright position to the folded position, and also provides for folding of the seat back 24.

Figure 2:
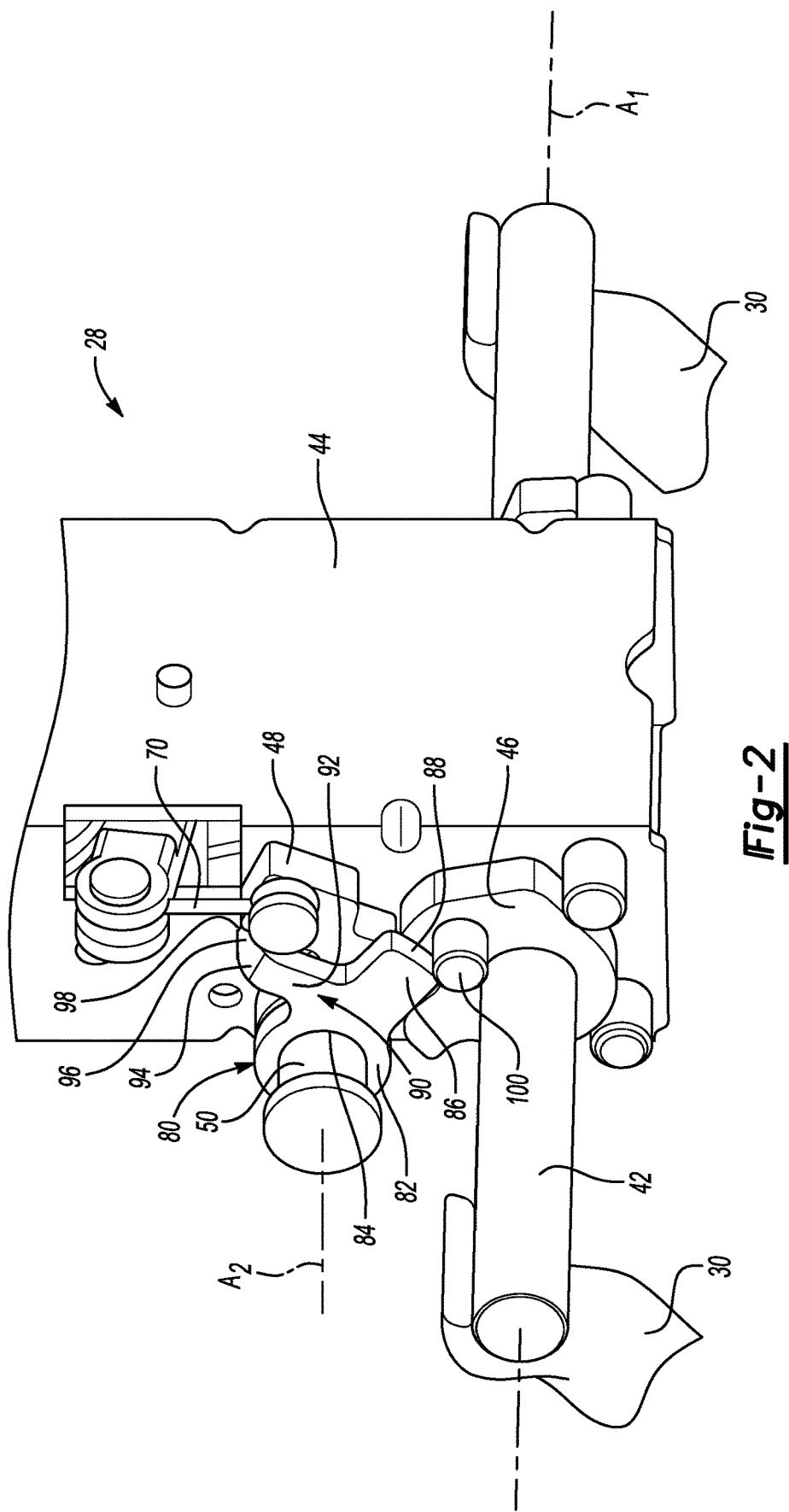
FIG. 2 is a perspective view of an example headrest assembly in an upright position.
Figure 3:
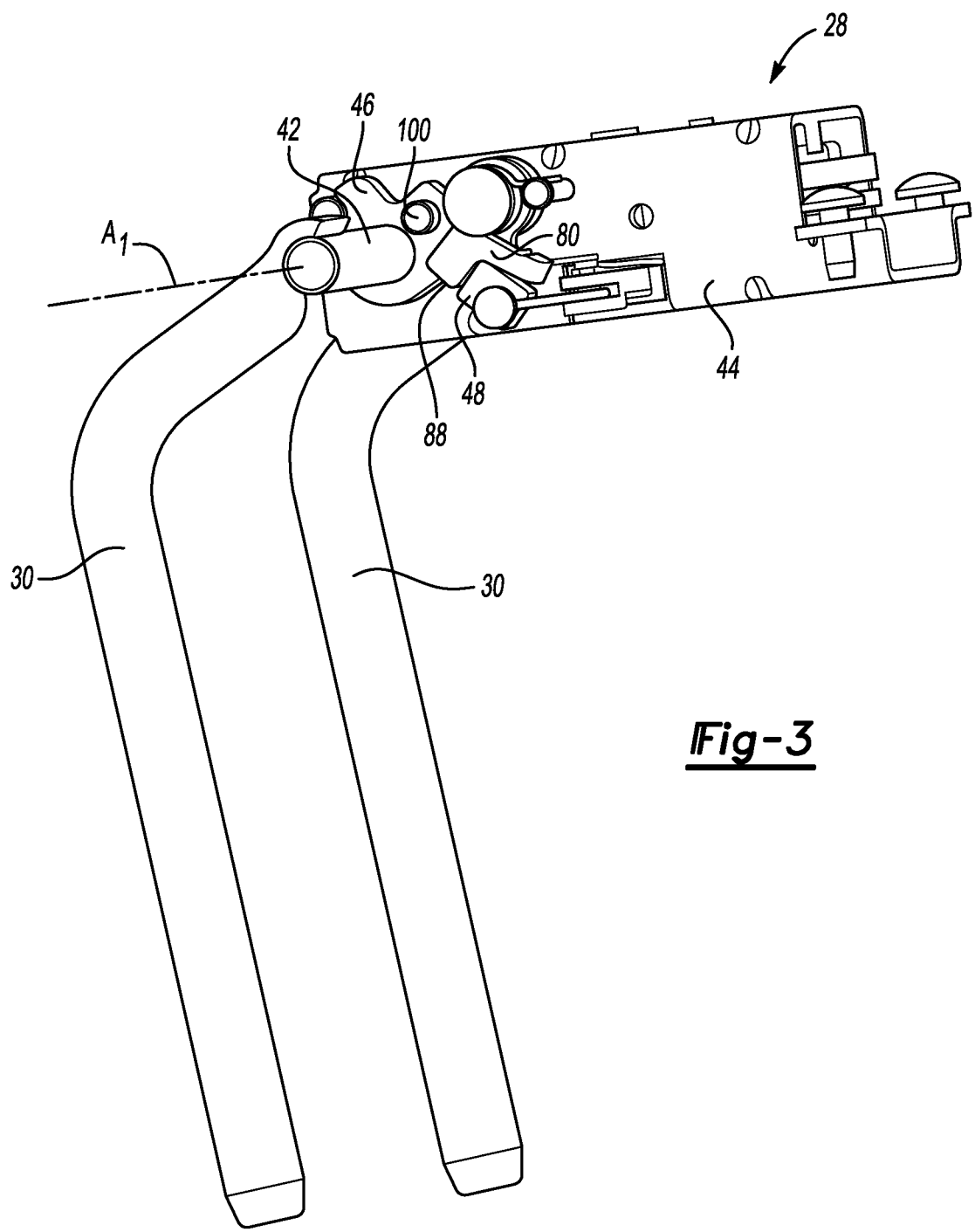
FIG. 3 is a perspective view of the example headrest assembly in a folded position.

FIG. 2 is a perspective view illustrating an example arrangement of the head restraint 28 in an upright position. In FIG. 2, the internal components of the head restraint 28 are illustrated. While not illustrated in FIG. 2, the head restraint 28 is configured to support a cushion and an encasement. FIG. 1 shows the head restraint 28 supporting a cushion, which may include foam encased in fabric, such as leather or cloth.

The head restraint 28 is configured for rotation about a horizontal rod 42, which is connected between two rods 30. The rods 30 connect the head restraint 28 to the seat back 24. The horizontal rod 42 is provided along a longitudinal axis $A_1$.

FIG. 3 illustrates the head restraint 28 in a folded position. In FIG. 3, the head restraint 28 has rotated about the axis $A_1$ relative to the upright position. In one example, the head restraint 28 rotates in a rearward direction (e.g., away from the occupant space provided by the seat 20) when moving from the upright position to the folded position. In another example, the head restraint rotates in a forward direction.

In FIGS. 2 and 3, a support cage 44 is illustrated. The support cage 44 includes a plurality of plates, which may be made of metal, and at least partially houses various components of the head restraint 28, and in particular those components that regulate and permit movement of the head restraint 28 between the upright and folded positions. The support cage 44 is configured to rotate about the axis $A_1$. The cushions/encasements of the head restraint 28 may be mounted directly or indirectly to the support cage 44.

Figure 4:
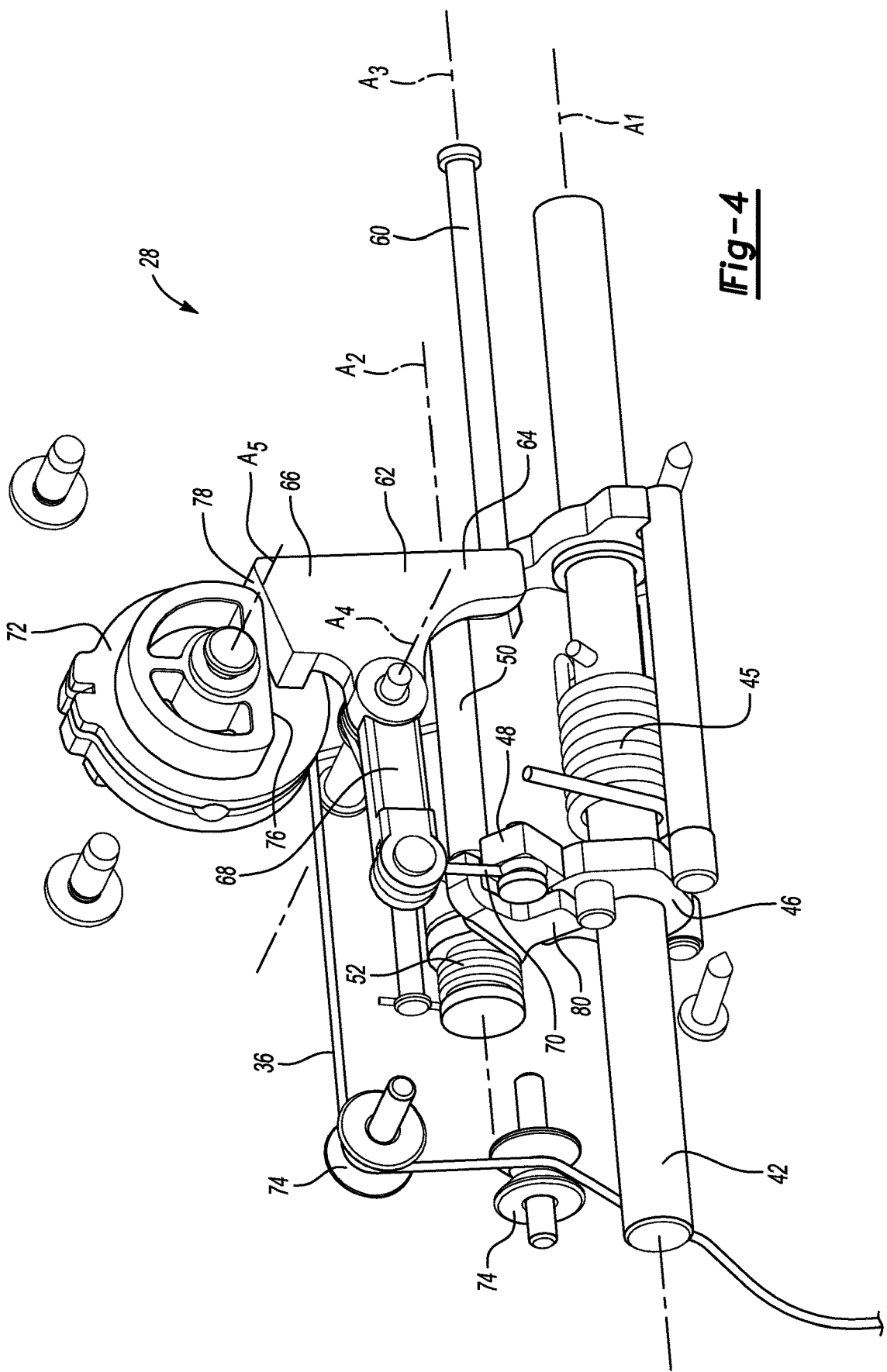
FIG. 4 is a perspective view illustrating additional detail of the example headrest assembly.

FIG. 4 illustrates additional detail head restraint 28 with the support cage 44 removed for ease of reference. Many of the components illustrated in FIG. 4 are mounted, directly or indirectly, to the support cage 44. The head restraint 28 and, in particular, the support cage 44 is biased toward the folded position by way of a first biasing member 45. The first biasing member 45 is, in this example, a coil spring disposed about the horizontal rod 42. The first biasing member 45 contacts the horizontal rod 42 and the support cage 44 directly.

The head restraint 28 is held in the upright position against the bias of the first biasing member 45 by a locking plate 46 and a locking trigger 48. The locking trigger 48 is rotatable about another horizontal rod 50, which extends along an axis $A_2$. The horizontal rod 50 is connected to the head restraint 28 via the support cage 44. The axis $A_2$ is spaced-apart from and substantially parallel to the axis $A_1$. The locking trigger 48 is rotatably biased toward the locking plate 46 by a second biasing member 52. The second biasing member 52 in this example is a coil spring provided about the horizontal rod 50.

Figure 5:
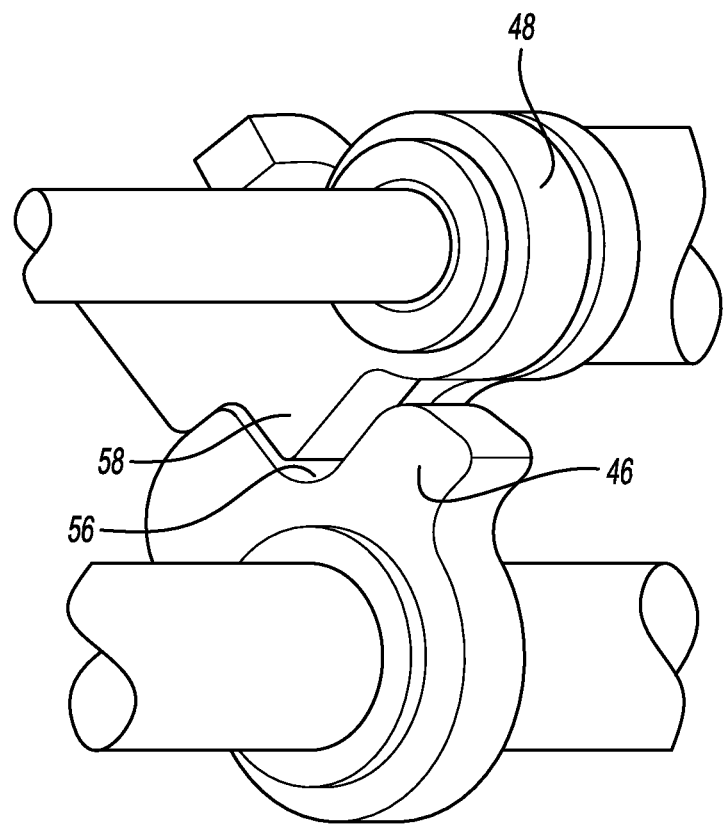
FIG. 5 is a close-up view of a portion of the example headrest assembly.

The locking plate 46 includes a notch 56 (FIG. 5) configured to receive a projection 58 of the locking trigger 48. When the head restraint 28 is in the upright position, the locking trigger 48 is engaged with the locking plate 46 such that the projection 58 is received in the notch 56. When received in the notch 56, the projection 58 prevents rotation of the head restraint 28. While a projection and notch are illustrated in this example, other forms of engagement between the locking trigger 48 and locking plate 46 come within the scope of this disclosure.

The locking trigger 48 is configured to disengage the locking plate 46, thereby allowing the head restraint 28 to move to the folded position, in response to movement of either the push-button 32 or the pull-cable 36. With respect to the push-button 32, the push-button 32 is directly coupled to a push-pin 60 in this example. The push-pin 60 has a longitudinal axis $A_3$ and is configured to move in a direction parallel to the axes $A_1$, $A_2$ when the push-button 32 is pressed. Opposite the push-button, the push-pin 60 is directly coupled to a push-lever 62.

The push-lever 62 includes three arms 64, 66, 68 in this example. In general, the push-lever 62 is configured to translate linear movement of the push-pin 60 into rotational movement of the locking trigger 48 about the axis $A_2$. In this example, the push-lever 62 is mounted for rotation about an axis $A_4$, which is substantially perpendicular to the axes $A_1$, $A_2$, $A_3$. Axis $A_4$ runs substantially in-and-out of the page relative to FIG. 4. The three arms 64, 66, 68 of the push-lever 62 project outward from the axis $A_4$.

As the push-pin 60 moves along the axis $A_3$ in the left-hand direction (relative to FIG. 4), the push pin 60 pushes the arm 64 of the push-lever in the left-hand direction (relative to FIG. 4), which results in rotation of the push-lever 62 about the axis $A_4$ in the clockwise direction (again, relative to FIG. 4). Such movement causes the arm 68 to move generally upwardly (relative to FIG. 4). The arm 68 is coupled to the locking trigger 48 by way of a link 70. As such, upward movement of the arm 68 causes the locking trigger 48 to move such that the projection 58 is removed from the notch 56. Thus, the head restraint 28 is allowed to move to the folded position.

Opposite the arm 64, the push-lever 62 includes an arm 66, which is in contact with a cam 72. The cam 72 is rotatable about axis $A_5$, which is substantially parallel to the axis $A_4$ and substantially perpendicular to axes $A_1$, $A_2$, $A_3$. The cam 72 is biased by a biasing member, such as a coil spring, to a resting position where it does not move the arm 66.

The cam 72 is connected to and configured to rotate in response to movement of the pull-cable 36. The head restraint 28 may optionally include one or more pulleys 74 configured to guide the pull-cable 36 between the rod 30 and the cam 72.

When the pull-cable 36 is pulled in the downward direction (relative to FIG. 4), such as by activation of the actuator 34, the pull-cable 36 overcomes the bias of the cam 72 to the resting position and rotates the cam 72 about the axis $A_5$ in a clockwise direction (again, relative to FIG. 4). Such movement of the cam 72 causes a substantially flat surface 76 of the cam 72 to engage an inclined surface 78 of the arm 66 to rotate the arm 66 and the push-lever 62 to rotate in the clockwise direction. Like with the push-button 32, such rotation of the push-lever 62 causes the arm 68 to move generally upwardly, which in turn moves the locking trigger 48 upwardly and out of engagement with the locking plate 46. Accordingly, movement of the pull-cable 36 allows the head restraint 28 to move to the folded position.

A further aspect of this disclosure relates to increasing the tightness of the head restraint 28 such that it does not vibrate excessively, or to any noticeable degree, during use of a vehicle, such as vehicle travel. As such, in this disclosure, the head restraint 28 includes a pawl 80 (FIG. 2) configured to engage the locking plate 46 to resist vibration between, for example, the portions of the head restraint 28 configured to rotate about the horizontal rod 42 and those that are not configured for such rotation. To this end, the pawl 80 may be referred to as a cinching pawl or an anti-vibration pawl.

The pawl 80 is configured to rotate about the horizontal rod 50 and about the axis $A_2$. The pawl 80 includes a base 82 extending circumferentially about the horizontal rod 50 and including an opening 84 receiving the horizontal rod 50. The opening 84 may be non-circular. The pawl 80 further includes a first arm 86 projecting normally from the axis $A_2$ between the base 82 and a free end 88. The free end 88 exhibits a substantially flat surface normal to the length of the first arm 86.

The pawl 80 further includes a second arm 90. The second arm 90 includes a first section 92 projecting normally from an upper surface of the first arm 86 at a point adjacent the base 82. The first section 92 extends to a bend 94, which in this example is a 90-degree bend. A second section 96 projects normally from the first section 92 at the bend 94 and extend to a free end 98. The second section 96 extends along a length parallel to the axis $A_2$.

With reference to FIG. 4, the biasing member 52 engages the first section 92 and is configured to urge the pawl 80 to rotate about the axis $A_2$ in the clockwise direction (as viewed, in particular, relative to FIG. 2). The locking trigger 48 is in direct contact with the second section 96. Thus, in this example, the biasing member 52 imparts force onto the locking trigger 48 via the pawl 80, and movement of the locking trigger 48 overcoming the biasing member 52 results in corresponding movement of the pawl 80.

When the head restraint 28 is in the upright position, as in FIG. 2, the free end 88 of the pawl 80 is configured to directly contact a projection 100 of the locking plate 46. The projection 100 is a cylindrical projection, in this example, and projects from the locking plate 46 generally to the left in FIG. 2, in a direction opposite the location of the support cage 44. The free end 88 is configured to directly contact the rounded outer contour of the projection 100. The projection 100 could exhibit a flat surface configured to contact the substantially flat free end 88.

As shown in FIG. 3, given the arrangement between the pawl 80 and the locking trigger 48, when the locking trigger 48 is lifted by the link 70 to disengage the locking plate 46, the pawl 80 is rotated with the locking trigger 48 such that the free end 88 no longer directly contacts the projection 100. Thus, the pawl 80 does not inhibit movement of the head restraint 28 to the folded position, nor does the pawl 80 inhibit movement of the head restraint 28 as it moves from the folded position back to the upright position.

Contact between the free end 88 and the projection 100 counters the bias of the moving components of the head restraint 28 toward the folded position brought about by the biasing member 45. While the locking plate 46 and locking trigger 48 also counter such rotation when engaged with one another, the pawl 80 provides additional resistance to vibrations that may not be fully dampened or resisted by the locking plate 46 and locking trigger 48. Accordingly, contact between the free end 88 and the projection 100 increases the tightness of the headrest assembly, and in turn reduces vibrations of the headrest assembly. Further, and especially when the projection 100 exhibits a rounded contour, the force required to cause the head restraint 28 to move to the folded position is not significantly, or even noticeably, increased relative to configurations that do not include the pawl 80.

It should be understood that terms such as "upward," "downward," "clockwise," "counter-clockwise," "forward," "rearward," etc., are used above with reference to the orientation of the head restraint in the figures and in its normal operating position. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A headrest assembly, comprising:
a head restraint including a push-button and a push-lever, wherein the push-lever is rotatable by a pull cable, wherein the head restraint is moveable from an upright position to a folded position by movement of the push-button or the pull cable, wherein the head restraint includes a pawl configured to resist vibrations of the head restraint,
wherein the head restraint includes a locking plate and a locking trigger engaged with the locking plate when the head restraint is in the upright position,
wherein the locking trigger is configured to disengage the locking plate in response to movement of the push-button or pull cable,
wherein the push-button is directly coupled to a push-pin,
wherein the push-pin is directly coupled to the push-lever, and
wherein the push-lever is coupled to the locking trigger via a linkage.

2. The headrest assembly as recited in claim 1, wherein the push-button is configured to move in a linear direction along a first axis, and wherein the push-lever is configured to rotate about a second axis perpendicular to the first axis.

3. The headrest assembly as recited in claim 1, wherein:
the pawl includes a first arm having a free end configured to directly contact a projection of the locking plate when the head restraint is in the upright position.

4. The headrest assembly as recited in claim 3, wherein:
the pawl includes a second arm projecting from the first arm and configured to directly contact the locking trigger.

5. The headrest assembly as recited in claim 4, wherein:
the second arm includes a first section projecting normally from the first arm and a second section projecting normally from the first section, and
the second section directly contacts the locking trigger.

6. The headrest assembly as recited in claim 1, wherein:
the push-lever is configured to translate linear movement of the push-pin into rotational movement of the locking trigger,
the push-lever is pivotable about an axis perpendicular to an axis of rotation of the locking trigger,
the push-lever is rotatably moveable in response to movement of the pull-cable, and
rotational movement of the push-lever causes rotational movement of the locking trigger.

7. A seat for a motor vehicle, comprising:
a seat back;
a pull-cable;
a headrest assembly, comprising:
a head restraint including a push-button and a push-lever, wherein the push-lever is rotatable by a pull cable, wherein the head restraint is moveable from an upright position to a folded position by movement of the push-button or the pull cable, wherein the head restraint includes a pawl configured to resist vibrations of the head restraint;
wherein the head restraint includes a locking plate and a locking trigger engaged with the locking plate when the head restraint is in the upright position, and
wherein the locking trigger is configured to disengage the locking plate in response to movement of the push-button or the pull cable,
wherein the pawl includes a first arm having a free end configured to directly contact a projection of the locking plate when the head restraint is in the upright position; and
an actuator configured to pull the pull-cable to move the head restraint to a folded position and to fold the seat back.

8. The seat as recited in claim 7, wherein the push-button is configured to move in a linear direction along a first axis, and wherein the push-lever is configured to rotate about a second axis perpendicular to the first axis.

9. The seat as recited in claim 7, wherein:
the pawl includes a second arm projecting from the first arm and configured to directly contact the locking trigger.

10. The seat as recited in claim 9, wherein:
the second arm includes a first section projecting normally from the first arm and a second section projecting normally from the first section, and
the second section directly contacts the locking trigger.

11. The seat as recited in claim 1 lclaim 7, wherein:
the push-button is directly coupled to a push-pin,
the push-pin is directly coupled to the push-lever,
the push-lever is coupled to the locking trigger via a linkage,
the push-lever is configured to translate linear movement of the push-pin into rotational movement of the locking trigger,
the push-lever is pivotable about an axis perpendicular to an axis of rotation of the locking trigger,
the push-lever is rotatably moveable in response to movement of the pull-cable,
rotational movement of the push-lever causes rotational movement of the locking trigger.

12. The seat as recited in claim 7, further comprising:
a rod, the head restraint coupled to the seat by way of the rod, wherein the rod is hollow and the pull-cable is routed through the rod, and wherein the head restraint includes a pulley configured to guide the pull-cable.

13. A method, comprising:
folding a head restraint from an upright position to a folded position by movement of a push-button or a cable, wherein the cable is connected to a push-lever, and
resisting vibration of the head restraint using a pawl, wherein the pawl includes a first arm having a free end configured to directly contact a projection of a locking plate when the head restraint is in the upright position.

14. The method as recited in claim 13, wherein:
the pawl includes a second arm projecting from the first arm and configured to directly contact a locking trigger.

15. The method as recited in claim 14, wherein:
the second arm includes a first section projecting normally from the first arm and a second section projecting normally from the first section, and
the second section directly contacts the locking trigger.

* * * * *

UNITED STATES PATENT AND TRADEMARK OFFICE
CERTIFICATE OF CORRECTION

PATENT NO. : 11,584,275 B2
APPLICATION NO. : 16/902605
DATED : February 21, 2023
INVENTOR(S) : Wang It is certified that error appears in the above-identified patent and that said Letters Patent is hereby corrected as shown below:

In the Claims

Claim 11, Column 8, Line 27, change "Claim 1 1claim 7" to --Claim 7--

Signed and Sealed this
Twenty-first Day of March, 2023

Katherine Kelly Vidal
*Director of the United States Patent and Trademark Office*